United States Patent [19]
Kerr et al.

[11] Patent Number: 5,597,475
[45] Date of Patent: *Jan. 28, 1997

[54] DADMAC/VINYL TRIALKOXYSILANE COPOLYMERS FOR DEWATERING COPPER AND TACONITE SLURRIES IN THE MINING INDUSTRY

[75] Inventors: E. Michael Kerr, Aurora; Manian Ramesh, Lisle, both of Ill.

[73] Assignee: Nalco Chemical Company, Naperville, Ill.

[ * ] Notice: The term of this patent shall not extend beyond the expiration date of Pat. No. 5,476,522.

[21] Appl. No.: 508,642

[22] Filed: Jul. 28, 1995

[51] Int. Cl.$^6$ .......................... C10G 33/04; B01D 21/01; C10L 5/00
[52] U.S. Cl. .......................... 208/188; 208/187; 208/370; 210/734; 44/620; 44/621
[58] Field of Search .................................. 208/188, 187, 208/370; 210/734; 44/620, 621

[56] References Cited

U.S. PATENT DOCUMENTS

| | | | |
|---|---|---|---|
| 3,624,019 | 11/1971 | Anderson et al. | 260/29.6 H |
| 4,151,202 | 4/1979 | Hunter et al. | 260/567.6 R |
| 4,801,388 | 1/1989 | Fong et al. | 210/701 |
| 4,929,655 | 5/1990 | Tekeda et al. | 524/458 |
| 5,006,590 | 4/1991 | Takeda et al. | 524/458 |
| 5,120,797 | 6/1992 | Fong et al. | 525/329.4 |
| 5,296,006 | 3/1994 | Reed et al. | 44/621 |
| 5,330,546 | 7/1994 | Ramesh et al. | 44/620 |
| 5,476,522 | 12/1995 | Kerr et al. | 44/626 |

*Primary Examiner*—Glenn A. Caldarola
*Assistant Examiner*—Patricia L. Hailey
*Attorney, Agent, or Firm*—Robert A. Miller; James J. Drake; Patricia A. Charlier

[57] ABSTRACT

A method for dewatering mineral slurries employing a copolymer of diallyldimethlylammonium halide and a vinyl alkoxysilane, which is preferably a copolymer of diallyldimethylammonium chloride and vinyltrimethoxysilane as a coagulant is disclosed. The method for dewatering mineral slurries containing water comprising the steps of: feeding said mineral slurry into a thickener, treating said mineral slurry with an effective amount of a coagulant which comprises a copolymer of halide and a vinyl alkoxysilane; allowing the water to separate from the mineral slurry, withdrawing the water from said thickener and discharging said mineral products from said thickener. Mineral slurries which can be effectively treated are copper and taconite. The above-mentioned method may also include treatment with a flocculant in conjunction with the coagulant.

10 Claims, No Drawings

5,597,475

DADMAC/VINYL TRIALKOXYSILANE COPOLYMERS FOR DEWATERING COPPER AND TACONITE SLURRIES IN THE MINING INDUSTRY

FIELD OF THE INVENTION

The present invention relates generally to the use of novel hydrophobically associating polyelectrolyte compositions for dewatering mineral slurries. These polyelectrolyte compositions are hydrophobically associating copolymers of diallydimethylammonium halides, and particularly diallydimethylammonium chloride (DADMAC) and vinyl alkoxysilaned, preferably, vinyl trimethoxysilane (VTMS). The present application claims priority from co-pending U.S. application Ser. No. 08/447,302 filed May 22, 1995, which is in turn a continuation-in-part U.S. application Ser. No. 08/401,640 filed Mar. 8, 1995, the contents of which are hereby incorporated by reference.

BACKGROUND OF THE INVENTION

Coal is the most abundant natural energy source in the world. A significant portion of the U.S. dosmetic energy requirements are met by burning coal as a fossil fuel. There are various types of coal found within the U.S., i.e., anthracite, semi-anthracite, low-volatile bituminous coal, medium and high volatile bituminous coal, sub-bituminous coal, and lignite. Coals such as anthracite and semi-anthracite typically have high ash and sulfur contents and therefore require beneficiation prior to use.

The primary purpose of coal beneficiation is to reduce the incombustible ash content, thus enhancing the heat content. Reduction in the ash content results in savings in transportation and ash disposal costs. Sulfur, mainly in the form of purite, is also reduced.

Another important economic factor to be considered in coal processing is the recovery and reuse or process water. Water is typically very expensive and there are often limits on total usage. Also, strict enviromental controls prohibit or severely limit discharge of process water. Thus, it is imperative that solids be efficiently removed from the process water and water recycled to the process stream.

Beneficiation of coal is effected using two primary properties of coal, i.e., ( 1) differences in specific gravity between coal and its impurities, and (2) differences in surface characteristics between coal and its impurities. Since the higher ash content fractions are usually found in the finer coal sizes, some plants only screen out these sizes to beneficiate the coal. However, since the quantity of such fine coal is on the rise, even this is treated.

A coal beneficiation plant may be broadly divided into specific gravity separation and fine coal treatment. In gravity separation, cleaning units make use of the differences in specific gravity between coal and its impurities to effect separation. Normally, the specific gravity of the clean coal is less than that of its impurities. Some examples of commonly used equipment for gravity separation are: jigs, heavy medium baths and cyclones, washing tables, water-only cyclones and spirals.

Fine coal treatment incorporates a flotation cell(s), clean coal filter and thickener. In the flotation cell, a collector and frother are added to the flotation feed. A collector such as diesel oil selectively imparts hydrophobicity to the coal particles. This increased hydrophobicity makes the air bubbles more likely to attach to the coal particles. The frother, generally an alcohol based product, reduces the surface tension of the air/water interface, thus making a stable froth.

The clean coal concentrate from the flotation cells goes to the clean coal filter and is dewatered. The tailings from the flotation cell go to the thickener where they are thickened and discharged.

The thickener is treated with coagulants and flocculants to enhance settling. Typically, the coagulants and flocculants are added at several points along the feed line to the thickener and in different sequences. Coagulation is the destabilization by surface charge neutralization of stable negatively charged particles that are in suspension (i.e., settleable or dispersed) through the utilization of inorganic salts or cationic polyelectrolytes. Flocculation is the aggregation of finely divided particles which are suspended in a liquid through the utilization, of an entrapping agent, generally an inorganic flocculant, or a bonding agent, generally an organic flocculant, that brings the particles together.

During the processing of coal, a coal refuse slurry is generated. This slurry consists of residual coal fines and clays suspended in plant process water. Due to the high volume of water used in the processing of coal, it is necessary to reclaim the wash water for recirculation in the plant. The concentrated solids are sent to an impoundment pond for disposal. Generally, the use of anionic flocculants is sufficient to remove the majority of the coal fines; however, when there are high levels of clay in the mined coal, it is necessary to supplement the use of anionic flocculants with the use of cationic coagulants. The sequential addition of flocculants and coagulants is used primarily in the coal refuse thickener and in the subsequent twin belt press filtration of the thickener underflow. The typical application order in the thickener, which is similar to a clarifier, is coagulant addition followed by flocculant addition. This provides a controlled turbidity of the recycle process water and a controlled solids settling rate. In the thickener underflow filtration, the order of application is normally flocculant followed by coagulant. This treatment gives highly agglomerated solids which provides effective dewatering of the waste solids and low turbidity in the recycled process water.

The decrease in sludge volume or the increase in sludge solids results in more efficient use of plant process water and a reduced loading in the impoundment pond. The impoundment pond is the area of the mine where the sludge is used to landfill existing mined surfaces. With time, the sludge further compresses in the impoundment area which provides reclaimed mine sites.

The typical equipment used for sludge thickening and dewatering in the coal industry are Gravity Thickener, Twin Belt Press, and Rotary Drum Filters. Each of these pieces of equipment uses flocculants and coagulants. The doses of flocculant and cationic polymers are 5–10 ppm and 1–5 ppm, respectively, for the thickener and 5–20 ppm and 5–30 ppm, respectively, for the filter applications. These polymers are highly surface active and they remain with the solids that are sent to the impoundment pond. These products are used in closed loop coal refuse treatment applications. A treating polymer is also required for the dewatering of other mining underflow solids such as copper ore refuse slurries.

In addition to the treatment of fine coals, dewatering is also necessary in mineral processing. A variety of mineral slurries such as taconite, copper, trona, sand and gravel slurries and titania require solids removal and dewatering. The same basic processing steps are utilized to extract titanium oxide from titania, for example.

Although some inorganics, principally alum and iron salts, are still used as coagulants, water soluble organic polymers are now more prevalent. Both naturally occurring and synthetic polymers find use as coagulants and flocculants in the mining industry. The principal natural polymers used are starch and guar, both of which are high-molecular weight polymers of simple sugars, such as polysaccharides. Starch is a polymer of glucose consisting of a mixture of linear (amylose) and branched segments (amylopectin).

Synthetic polymers are advantageous because they can be tailored to a specific application. This has resulted in a wide range of commercially available coagulants and flocculants of varying charge, composition, and molecular weight. The most widely used synthetic coagulants are polydiallyldimethylammonium chloride (polyDADMAC) having molecular weights in the range of from 100,000 to as high as 1,000,000 or higher and condensation polymers of dimethylamine and epichlorohydrin (Epi/DMA) which generally have molecular weights in the range of 20,000 to 100,000.

The present inventors have developed various novel hydrophobically modified polyelectrolyte copolymers which may be used as coagulants in the thickening process during mineral processing. These cationically charged hydrophobically modified polymers which incorporate into the polymer backbone a vinyl alkoxysilane, exhibit improved performance or activity in thickening over conventional inorganic and organic coagulants. The unique cationic and surface active polymers of this invention are advantageous over conventional polymers because they are capable of both increased surface activity, as evidenced by the lowering of surface tension, and adsorption onto hydrophobic surfaces.

The advantages of the diallydimethylammonium chloride/ vinyl trialkoxysilane copolymers stem from the fact that they have the following characteristics: 1) silicon components are capable of forming networks with other silicon moieties, similar to crosslinking; and 2) incorporated silicon functionalities are capable of adhering or adsorbing to hydrophobic surfaces. The hydrophobically associating copolymers of the instant invention demonstrate enhanced performance with replacement ratios on the order of 0.35–0.50 over current commercially available poly (DADMAC) treatments.

The present invention also provides many additional advantages which shall become apparent as described below.

SUMMARY OF THE INVENTION

A method for dewatering mineral slurries employing a copolymer of diallyldimethlylammonium halide and a vinyl alkoxysilane, which is preferably a copolymer of diallyldimethylammonium chloride and vinyltrimethoxysilane as a coagulant is disclosed. The method for dewatering mineral slurries containing water comprising the steps of: feeding said mineral slurry into a thickener, treating said mineral slurry with an effective amount of a coagulant which comprises a copolymer of halide and a vinyl alkoxysilane; allowing the water to separate from the mineral slurry, withdrawing the water from said thickener and discharging said mineral products from said thickener. Mineral slurries which can be effectively treated are copper and taconite. The above-mentioned method may also include treatment with a flocculant in conjunction with the coagulant.

Other and further objects, advantages and features of the present invention will be understood by reference to the following specification.

DESCRIPTION OF THE INVENTION

The present inventors have developed a new class of coagulants which exhibit enhanced performance in dewatering of mineral slurries. These coagulants are copolymers of DADMAC and trialkoxysilanes. Such hydrophobically associating copolymers have an enhanced performance with replacement ratios on the order of about 0.35 to about 0.50 over commercially available poly(DADMAC) treatments.

The mineral slurries are preferably treated with coagulants and optionally with flocculants. It has been discovered that surface charge neutralization of colloidal particles in the mineral slurries can be enhanced by the use of a copolymer which has been modified to incorporate a certain degree of hydrophobicity. Such a modification can be accomplished by copolymerizing a diallyldimethylammonium halide, particularly diallyldimethylammonium chloride (DADMAC) with vinyl alkoxysilane, preferably vinyl trimethoxysilane.

The vinyl alkoxysilane monomers useful in the copolymer composition of the invention contain an alkyl group of from 1–4 carbon atoms. As such vinyl trimethoxy, triethoxy, tripropoxy and tributoxysilanes, and combinations thereof, may find use in the subject invention. While vinyl trialkoxysilanes are preferred, the monomers may be mono or di-substituted as well, or mixtures of mono-, di- and trialkoxy substituted silanes may be used. A preferred vinyl trialkoxysilane for use in this invention is vinyl trimethoxysilane, commercially available from Hals America, Piscataway, N.J.

Diallyldimethylammonium halides, especially diallyldimethylammonium chloride (DADMAC) are well-known and commercially available from a variety of sources. One method for the preparation of DADMAC is detailed in U.S. Patent No. 4,151,202, the disclosure of which is hereinafter incorporated by reference into this specification.

The mole ratio of DADMAC to the vinyl trialkoxysilane ranges from 99.99:01 to 80:20 and, preferably from 99.9:0.1 to 85:15. Most preferably, the mole ratio of DADMAC to the vinyl trialkoxysilane range from 99.9:0.1 to 95.0:5.0.

The polymers may be prepared as in conventional vinyl polymerization techniques. These techniques include conventional solution polymerization in water, and polymerization in water-in-oil emulsion form, such as that described in U.S. Pat. No. 3,624,019, the disclosure of which is hereinafter incorporated by reference into this specification. The polymers of the invention may also be prepared in so-called dispersion form, such as that described in U.S. Pat. Nos. 4,929,655 and 5,006,590 the disclosures of which is also hereinafter incorporated by reference into this specification. The polymers of the instant invention may be in solid, dispersion, latex or solution form.

Conventional free radical catalysis may be used, including both free radical initiators and redox systems. Such polymerizations are within the purview of those skilled in the art and as such will not be elaborated on in this specification.

The molecular weights of the copolymer prepared hereunder can vary greatly. Generally, copolymers of diallyldimethylammonium chloride and vinyl trimethoxysilane produced hereunder will have a molecular weight of from 50,000 to 5,000,000, and preferably 75,000 to 2,500,000, and most preferably from 100,000 to 1,000,000. The polymers of this invention will accordingly have a reduced specific viscosity for a one percent by weight polymer solution as measured in one molar sodium nitrate of from 0.2–5 dl/gm and preferably from 0.5–4.0 dl/gm. A most preferred reduced specific viscosity range is from 0.7–3.0 dl/gm. While discussed herein as copolymers of diallyldimethylammonium halides and vinyl alkoxysilanes, other monomers may be incorporated into the resultant polymers without detracting from the spirit and intent of the invention. Possible monomers that may be incorporated include, but are not limited to nonionic and cationic vinyl monomers. These materials are exemplified by acrylamide, and such cationic monomers as dimethylaminoethylmethacrylate and dimethylaminoethyl acrylate and their respective water soluble quaternary amine salts.

The copolymers of this invention may be used alone, or in combination with a high molecular weight anionic or non-ionic water soluble or dispersible flocculant. Such polymers include polyacrylamide, and copolymers of acrylamide with acrylic acid and its water soluble alkali metal or ammonium salts. As used herein, the term acrylic acid is meant to encompass such water soluble salts. Also useful are such polymers as sulfomethylated acrylamides as exemplified in U.S. Pat. Nos. 5,120,797 and 4,801,388, the disclosures of which are hereinafter incorporated by reference into this specification. Other commercially available anionic flocculant materials may also be utilized.

A preferred class of flocculants for use in this invention includes copolymers of acrylamide and acrylic acid having a mole ratio of acrylamide to acrylic acid of from 99:1 to 1:99 and preferably 99:1 to 50:50. Most preferably, the mole ratio of acrylamide to acrylic acid will be 95:5 to 60:40. An especially preferred flocculant for use in this invention has a mole ratio of acrylamide to acrylic acid of about 70:30.

The flocculants of this invention may be prepared in solution form, or in water-in-oil emulsion form. The preparation of such flocculants is known to those skilled in the art. The flocculants generally have molecular weights ranging from as low as 1,000,000 to 20,000,000 or higher. Preferred flocculants have a molecular weight of about 10,000,000. The upper weight of molecular weight is not critical so long as the polymer is water soluble or dispersible.

The flocculant is believed to cause the aggregation of the neutralized colloidal particles which are suspended in the tailings suspension. Aggregation is the result of either entrapping agents (i.e., inorganic flocculants) or bonding agents (i.e., organic flocculants) bringing the neutralized particles together.

The coagulants and flocculants can be added at several points along the feed line to the thickener and in different sequences. The flocculants may be added either prior to or subsequent to coagulant addition. A typical thickener is a gravity sedimentation unit which is a cylindrical continuous thickener with mechanical sludge raking arms. The tailings (i.e., a solids/liquid dispersion) enter the thickener at the centerwell. The coagulants and/or flocculants are added at points in the feed line and/or centerwell. The number of addition points, sequence, flocculant, coagulant, etc. are determined by laboratory cylinder tests for each particular application. The flocculated solids settle to the bottom of the thickener. The mechanical arms rake the sludge and it is discharged. The clarified water overflows into a launder surrounding the upper part of the thickener.

The copolymer of diallyldimethylammonium chloride and vinyl trialkoxysilane is generally added to the thickener or mechanical filter device at a rate of about 0.01 to about 0.3 lb/ton of slurry, and preferably 0.075 to about 0.25 lb/ton. Most preferably from about 0.1 to 0.25 lb of polymer is used per ton of slurry. The amount of coagulant will vary according to the particular stream to be dewatered. Flocculant may also be added to the thickener in an effective amount, generally between about 0.01 to about 0.25 lb/ton of slurry.

After treatment of the slurry with sufficient coagulant and optional flocculant, the thickener underflow or refuse (i.e., concentrated tailings) are removed from the bottom of the thickener, while water and/or other liquids are taken out overhead. The water can thereafter be recycled as process water for use in the beneficiation process or disposed of in impoundment ponds. The concentrated tailings or refuse from the thickener can be thereafter disposed of, generally as landfill.

In most instances, adding a given amount of flocculant in two or more increments results in better performance than adding the same amount of flocculant in one increment. It is not unusual to be able to reduce the amount of flocculant required by as much as 30–40% by multi-point addition and still achieve the required settling rate. Multi-point addition may also provide improved clarity (i.e., lower suspended solids) at a given settling rate.

This practice is implemented in a beneficiation plant process by adding the flocculant at different points in the feed line to the thickener. The improvement results from reducing the amount of surface area that the second or third portion of flocculant actually contacts when added to the system, as well as improved distribution of the flocculant.

The present invention can best be understood by reference to the following working and comparative examples.

EXAMPLE 1

A 90:10 mole copolymer of diallyldimethylammonium chloride (DADMAC) and vinyl trimethoxysilane (VTMS), at 20% actives, was prepared for use as a coagulant. The following reactants were used to form the hydrophobically modified polyelectrolyte copolymer coagulant:

| | |
|---|---|
| 312.91 grams | Diallydimethylammonium Chloride DADMAC (a 58% Solution) |
| 18.89 grams | Vinyl Trimethoxysilane (a 98% Solution) |
| 200.0 grams | Deionized Water |
| 1.80 grams | [2,2'-Azobis (2-amidinopropane)] Dihydrochloride Initiator |
| 20.0 grams | Sodium Chloride |
| 446.20 | Final Solution Water |
| 0.1 grams | Versene |

A semi-batch process was used to prepare the DADMAC/VTMS copolymer.

A 1.5L reactor equipped with a mechanical stirrer a thermocouple, nitrogen inlet/outlet tubes, condenser and two syringe pumps was set up. Vinyl trimethoxysilane was taken in the first pump set at a delivery rate of 4.5 cc/hr. The second pump contained an aqueous solution of 2,2' azobis (2-amidinopropane) dihydrochloride (1.2 g in 48.8 g DI water), and the pump was set at 12.5 cc/hr.

The DADMAC, sodium chloride, and Versene were charged into a polymerization reactor and heated to 52° C. The reaction mixture was purged with nitrogen. VTMS and initiator-containing pumps were started and the polymerization was allowed to proceed.

A thick polymer started forming after about 2 hours. At the end of two and a half hours, the viscosity increased to a point where continued agitation was difficult. 200 ml of deionized water was then added. The reaction continued for a period of 5 hours, and then subjected to a post treatment at 82° C. for 5 hours.

Product phase separated in two days and indicated extensive crosslinking as shown below:

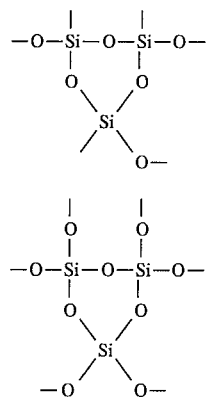

The phase-separated product swelled in water, yet was water-insoluble.

EXAMPLE 2

A 99.5/0.5 mole ratio copolymer of diallyldimethylammonium chloride (DADMAC) and vinyl trimethoxysilane (VTMS), at 20% actives, was prepared for use as a coagulant. The following reactants were used to form the hydrophobic polyelectrolyte copolymer coagulant:

| | | |
|---|---|---|
| 321.13 | grams | DADMAC (a 62% Solution) |
| 1.00 | grams | VTMS (a 98% Solution) |
| 0.2 | grams | Versene |
| 258.8 | grams | Deionized Water |
| 1.20 | grams | 2,2'-Azobis {2(2-imdazolin-2yl) propane Dihydrochloride Initiator |
| 61.00 | grams | Sodium Chloride |
| 356.87 | grams | Dilution Water |

A batch process was used to prepare the DADMAC/VTMS copolymer. A reactor similar to the one described in Example 1 was used.

The DADMAC, VTMS, Versene, sodium chloride and deionized water were charged into a polymerization reactor at a temperature of 58° C. Thereafter, the initiator (0.6 grams in 49.4 grams deionized water) was charged into the reactor dropwise via a syringe pump at 12.5 cc/hour.

A thick polymer started forming after about 1.0 hour. At the end of 1.5 hours, the mixture was difficult to stir. At this point, deionized water addition was started using a syringe pump set at 70 ml/hour. The reaction continued for a period of 5.5 hours. After that, initiator (0.6 grams in 19.4 grams of deionized water) was added. The reactor was heated to 82° C. and held at that temperature for 3 hours. The reaction product was then diluted with 356.87 grams of water and stored. Reduced specific viscosity and intrinsic viscosity measurements were determined on a 1% polymer solution in NaNO₃ (sodium nitrate) and found to be 2.02 and 1.3 dl/gm respectively.

EXAMPLE 3

A 99.0/1.0 mole ratio DADMAC/VTMS copolymer was prepared using the procedure of Example 2. 2.0 g of VTMS and 355.07 g of DI water were used in place of the amounts in Example II. All other quantities were the same. RSV/IV for a 1% by weight solution of the polymer in sodium nitrate were 2.2 and 1.2 dl/g, respectively. This material is hereinafter referred to as Example 3.

EXAMPLE 4

The gravity dewatering test is a tool for reliably screening products and evaluating application variables for dewatering. Results obtained in testing can generally be directly translated to the plant process. The following procedure outlines suggested steps in performing a thorough test program.

1. An apparatus consisting of a 500 ml graduated cylinder, powder funnel, and plastic collar which retains a filter cloth on the top of the powder funnel, all supported by a ringstand and appropriate clamps was constructed. The filter cloth used was a nylon Filterlink® 400 mesh round orifice cloth of a type similar to that used in commercial practice.

2. Obtain 5–10 gallons of untreated dewatered feed (clarifier underflow).

3. Using a spatula, hand mix the slurry to uniformly disperse any coarse solids present. Immediately sample and transfer 200 ml of underflow slurry into a 500 ml graduated cylinder. Re-mix the underflow slurry prior to filling each new cylinder.

4. Measure in a syringe and set aside the desired amount of coagulant as 1% solutions. Measure and add the desired amount of anionic polymer flocculant stock solution to a 50 or 100 ml graduated cylinder, dilute to a total of 20 ml (or 10% of the underflow slurry volume) with process water, mix thoroughly, and set aside.

5. Invert the 500 ml graduate cylinder containing the 200 ml of underflow slurry 4 times to thoroughly disperse the solids, then immediately add the pre-measured flocculant solution from step 3, re-stopper the cylinder and invert 4 times. Duplicate the mixing motion as closely as possible in each test.

6. Immediately add the pre-measured coagulant solution, re-stopper and invert 2 additional times.

7. Pour the conditioned slurry into the plastic collar section of the test apparatus and immediately start a stopwatch. Record the drainage volumes collected every 10 seconds for a time period greater than actual commercial plant process time for gravity drainage. After removing the plastic collar, note the dewatered cake stability and thickness. If the thickness is significantly different from plant conditions, adjust the initial test slurry volume in step 2 accordingly.

8. Repeat testing, adjusting products and dosages to obtain maximum free drainage volumes in the process time allowed.

Turbidity was measured with a Hach ratio/xR turbidimeter. The results of the testing performed at a midwestern mine are tabulated below in Table I. The blank is included for comparison purposes to demonstrate that the turbidity of the untreated mineral slurry is very high. The settling rate results indicate comparable settling may be achieved by polymers of the instant invention to settling rates achieved with conventional poly(DADMAC) treatment. However, the polymers of the instant invention are much more active, as demonstrated by lower dosages utilized.

TABLE I

Taconite Field Trial Results

| Cationic Polymer | Cationic Dosage (mls of 0.1% sol'n.) | Flocculant | Flocculant Dosage (mls of 0.1% sol'n.) | Turbidity (NTU) | Settling Rate (inches/min) |
|---|---|---|---|---|---|
| None | 0.00 | poly(AcAm/AA)[2] | 0.45 | 439 | 8.8 |
| latex poly(DADMAC) | 0.20 | poly(AcAm/AA)[2] | 0.45 | 173 | 15.0 |
| | 0.20 | | 0.45 | 197 | 13.3 |
| | 0.20 | | 0.22 | 246 | 7.6 |
| | 0.10 | | 0.22 | 392 | 7.6 |
| | 0.06 | | 0.15 | 460 | 5.0 |
| | 0.06 | | 0.15 | 504 | 4.1 |
| | 0.06 | | 0.10 | 618 | 4.5 |
| Example 3[3] | 0.03 | poly(AcAm/AA)[2] | 0.15 | 778 | 3.8 |
| | 0.04 | | 0.15 | 628 | 4.9 |
| | 0.04 | | 0.10 | 530 | 3.9 |
| | 0.06 | | 0.05 | 411 | 4.4 |
| poly(DADMAC)[1] | 0.8 | | | 496 | 3.3 |
| | 2 | | | 241 | 4.7 |
| BLANK | | | | 1832 | 0.8 |

[1]= commercially available dry polymer of polydiallyldimethylammonium chloride having approximately the same intrinsic viscosity as polymer of Example 3. Product is commercially available from Nalco Chemical Company, Naperville, Illinois.
[2]= the anionic poly(AcAm/AA) with a 70:30 molar ratio of acrylamide to acrylic acid.
[3]= 99:1 mole ratio of poly(DADMAC/VTMS) synthesized according to the procedure of Example 3.

EXAMPLE 5

A standard filter test leaf procedure which generates a filter cake whose weight and thickness thereafter are determined was utilized at a southwestern mining facility to obtain the results of Table II. The slurry sample size in each test was 600 mls of mineral slurry with a 30 second form time and a 90 second drying time.

The results indicate that the polymer of the instant invention works as well as conventional poly(DADMAC) treatments, yet at much lower concentrations.

TABLE II

Copper Processing Field Trial Results

| Sample | Lb/Ton latex poly(DADMAC) 40% polymer actives | Lb/Ton Example 3[1] 20% polymer actives | Lb/Ton poly(DADMAC)[2] 40% polymer actives | Wet Wt. | Dry Wt. | % Moisture | % Weight Changes | Yield #/sq. ft | Increase % Yield vs. Poly (DADMAC)[2] |
|---|---|---|---|---|---|---|---|---|---|
| #1 | 0 | 0 | 0 | 114.1 | 98.4 | 13.8 | — | 2.17 | — |
| #2 | 0 | 0 | 1 | 82.6 | 72.2 | 12.8 | <20.0%> | 1.59 | — |
| #3 | 0.25 | 0 | 0 | 177.7 | 153.7 | 13.5 | 50% | 3.39 | 113.0% |
| #4 | 0.5 | 0 | 0 | 252.7 | 220 | 12.0 | 124% | 4.85 | 205.00% |
| #5 | 0.75 | 0 | 0 | 288.7 | 251.6 | 12.8 | 156% | 5.55 | 249% |
| #6 | 0 | 0.25 | 0 | 137.7 | 118.4 | 14 | 21 | 2.61 | 64% |
| #7 | 0 | 0.5 | 0 | 176.7 | 153.7 | 12.9 | 56% | 3.39 | 113.00% |
| #8 | 0 | 0.75 | 0 | 246.7 | 216 | 12.4 | 120 | 4.76 | 199% |

[1]= 99:1 mole ratio of poly(DADMAC/VTMS) synthesized according to the procedure of Example 3.
[2]= commercially available dry polymer of polydiallyldimethylammonium chloride having approximately the same intrinsic viscosity as polymer of Example 3. Product is commercially available from Nalco Chemical Company, Naperville, Illinois.

While we have shown and described several embodiments in accordance with our invention, it is to be clearly understood that the same are susceptible to numerous changes apparent to one skilled in the art. Therefore, we do not wish to be limited to the details shown and described but intend to show all changes and modifications which come within the scope of the appended claims.

What is claimed is:

1. A method for dewatering mineral slurries containing water wherein said slurries are selected from the group consisting of copper and taconite comprising the steps of:
   a. feeding the mineral slurry into a thickener;
   b. treating said mineral slurry with an effective amount of a coagulant which comprises a copolymer of diallyldimethyl ammonium halide and a vinyl alkoxysilane;
   c. allowing the water to separate from the mineral slurry;
   d. withdrawing water from said thickener; and
   e. discharging the dewatered mineral products from said thickener.

2. The method of claim 1 wherein the diallyldimethylammonium halide is diallyldimethylammonium chloride and the vinyl alkoxylsilane is vinyl trimethoxysilane.

3. The method of claim 2 wherein the coagulant has a reduced specific viscosity in one molar sodium nitrate solution for one percent polymer actives from 0.2 to 5 dl/gm.

4. The method claim 2 wherein the coagulant has a reduced specific viscosity in one molar sodium nitrate solution for one percent polymer actives from 0.5 to 4.0 dl/gm.

5. The method of claim 2 wherein the coagulant has a reduced specific viscosity in one molar sodium nitrate solution for one percent polymer actives from 0.7 to 3.0 dl/gm.

6. The method of claim 2 wherein the mole ratio of diallyldimethyl ammonium chloride to vinyl trimethoxysilane ranges from 99.99:0.01 to 80:20.

7. The method of claim 2 wherein the mole ratio of diallyldimethylammonium chloride to vinyl trimethoxysilane ranges from 99.9:0.1 to 85:15.

8. The method of claim 2 wherein the mole ratio of diallyldimethylammonium chloride to vinyl trimethoxysilane ranges from 99.9:0.10 to 95.0:5.0.

9. The method of claim 2 further comprising the addition of a flocculant to said mineral slurries containing water.

10. The method of claim 9 wherein said flocculant is a copolymer of acrylamide and acrylic acid.

* * * * *

UNITED STATES PATENT AND TRADEMARK OFFICE
CERTIFICATE OF CORRECTION

PATENT NO. : 5,597,475
DATED : 1/28/97
INVENTOR(S) : E. Michael Kerr, et al.

It is certified that error appears in the above-indentified patent and that said Letters Patent is hereby corrected as shown below:

```
Please insert the following on the cover page:

Item [63],   --Related U.S. Application Data

Continuation-in-part of Ser.No. 08/447,302, issued
U.S. Patent No. 5,622,647, which is a continuation-
in-part of Ser. No. 08/401,640, issued U.S. Patent
No. 5,476,522--
```

Signed and Sealed this

Second Day of December, 1997

*Attest:*

BRUCE LEHMAN

*Attesting Officer*        *Commissioner of Patents and Trademarks*